US011716968B2

(12) United States Patent
Sieverding et al.

(10) Patent No.: US 11,716,968 B2
(45) Date of Patent: Aug. 8, 2023

(54) WATERER VALVE SYSTEM

(71) Applicant: Ritchie Industries, Inc., Conrad, IA (US)

(72) Inventors: Eric David Sieverding, Conrad, IA (US); Tad D Upah, Marshalltown, IA (US); Robert John Amundson, Marshalltown, IA (US)

(73) Assignee: Ritchie industries, Inc., Conrad, IA (US)

(*) Notice: Subject to any disclaimer, the term of this patent is extended or adjusted under 35 U.S.C. 154(b) by 782 days.

(21) Appl. No.: 16/151,427

(22) Filed: Oct. 4, 2018

(65) Prior Publication Data
US 2019/0098867 A1    Apr. 4, 2019

Related U.S. Application Data

(60) Provisional application No. 62/568,055, filed on Oct. 4, 2017.

(51) Int. Cl.
*F16K 31/524*    (2006.01)
*A01K 7/06*    (2006.01)
(Continued)

(52) U.S. Cl.
CPC ............. *A01K 7/04* (2013.01); *A01K 7/025* (2013.01); *A01K 7/06* (2013.01); *F16K 15/023* (2013.01);
(Continued)

(58) Field of Classification Search
CPC .......... F16K 31/18; F16K 31/24; F16K 31/26; F16K 31/265; F16K 31/524–52491;
(Continued)

(56) References Cited

U.S. PATENT DOCUMENTS

| 267,736 A | * | 11/1882 | Young | F16K 31/26 137/446 |
| 700,316 A | * | 5/1902 | Flagg | F16K 31/26 137/422 |

(Continued)

FOREIGN PATENT DOCUMENTS

CA    2001627 A1 * 12/1990

OTHER PUBLICATIONS

3/4" Cattle Valve & Float Configurations, Ritchie Parts Index 2014, Jun. 26, 2014, pp. 34-35.

*Primary Examiner* — Craig J Price
(74) *Attorney, Agent, or Firm* — Fredrikson & Byron, P.A.

(57) ABSTRACT

This disclosure provides apparatus and methods for watering livestock using a livestock waterer, a water source, and a waterer valve system for replenishing water in a water reservoir of the livestock waterer. A valve housing can be affixed to the water reservoir and coupled to a plunger. A cam can be pivotably coupled to the valve housing and one end of a float arm. A float component can be coupled to the opposite end of the float arm. Water from the water supply can enter the valve housing and exit an orifice in the valve housing along first and second side spouts. The float component can have a generally flat bottom and move vertically along with the water level within the water reservoir. As the float component moves vertically, the float arm pivots the cam. The cam can move the plunger in the valve housing to stop water flow.

20 Claims, 11 Drawing Sheets

(51) Int. Cl.
  *A01K 7/04* (2006.01)
  *F16K 15/02* (2006.01)
  *A01K 7/02* (2006.01)
  *F16K 31/26* (2006.01)
  *F16K 33/00* (2006.01)
  *F16K 31/18* (2006.01)

(52) U.S. Cl.
  CPC .............. *F16K 31/18* (2013.01); *F16K 31/26* (2013.01); *F16K 31/265* (2013.01); *F16K 31/524* (2013.01); *F16K 33/00* (2013.01); *Y10T 137/7468* (2015.04); *Y10T 137/7478* (2015.04)

(58) Field of Classification Search
  CPC .. F16K 31/00; F16K 15/023; Y10T 137/7475; Y10T 137/7478; Y10T 137/7485; Y10T 137/053; Y10T 137/6004; Y10T 137/7358–7494; A01K 7/04; A01K 7/06; A01K 7/025; G05D 7/0146; G05D 7/0153; G05D 7/016; G05D 7/0166; G05D 7/0173; G05D 7/018; G05D 9/00; G05D 9/02; G05D 9/04
  USPC ......... 251/251–263, 357–365; 137/434, 435, 137/442, 445, 412, 416, 446, 443; 119/72, 72.5, 74, 78–80; 141/198
  See application file for complete search history.

(56) References Cited

U.S. PATENT DOCUMENTS

| | | | | |
|---|---|---|---|---|
| 741,343 A * | 10/1903 | Keddington | ............ | F16K 31/26 137/445 |
| 812,337 A * | 2/1906 | Gray | ............ | F16K 31/26 137/443 |
| 927,368 A * | 7/1909 | Mauldin | ............ | F16K 31/26 137/426 |
| 1,172,584 A * | 2/1916 | Conrad | ............ | A01K 7/04 119/78 |
| 1,579,140 A * | 3/1926 | Phillips | ............ | F16K 47/02 137/434 |
| 1,623,374 A * | 4/1927 | Oscar | ............ | A01K 7/04 137/449 |
| 1,653,525 A * | 12/1927 | White | ............ | A01K 7/04 119/81 |
| 1,677,687 A * | 7/1928 | Reed | ............ | F16K 31/26 137/446 |
| 1,786,024 A * | 12/1930 | Olson | ............ | A01K 39/024 119/73 |
| 2,164,934 A * | 7/1939 | McGrath | ............ | F16K 31/265 137/445 |
| 2,209,473 A * | 7/1940 | Price | ............ | E03D 11/00 137/445 |
| 2,541,622 A * | 2/1951 | Toadvine | ............ | F16K 21/165 119/80 |
| 2,722,231 A * | 11/1955 | Hansen | ............ | F16K 31/26 137/446 |
| 2,847,025 A * | 8/1958 | Abraham | ............ | F16K 31/26 137/426 |
| 2,869,578 A * | 1/1959 | Crockett | ............ | F16K 31/26 137/444 |
| 3,342,206 A * | 9/1967 | Martin | ............ | F16K 31/26 137/436 |
| 3,746,305 A * | 7/1973 | Zakka | ............ | F16K 1/422 251/360 |
| 3,759,228 A * | 9/1973 | Keen | ............ | A01K 7/04 119/79 |
| 3,823,732 A * | 7/1974 | Elsby | ............ | F16K 31/26 137/436 |
| 3,835,882 A * | 9/1974 | Barker | ............ | F16K 31/26 137/445 |
| 4,013,092 A * | 3/1977 | Reitman | ............ | F16K 31/26 137/426 |
| D257,544 S * | 11/1980 | Johnson | ............ | D23/236 |
| 4,488,571 A * | 12/1984 | Sladky | ............ | F16K 3/02 137/315.08 |
| 4,655,244 A * | 4/1987 | Park | ............ | F16K 31/265 137/449 |
| 4,796,650 A * | 1/1989 | Hwang | ............ | F16K 31/26 137/443 |
| 4,901,753 A * | 2/1990 | Barker | ............ | F16K 31/26 119/80 |
| 5,203,038 A * | 4/1993 | Gibbs | ............ | E04H 4/12 4/508 |
| 5,282,496 A * | 2/1994 | Kerger | ............ | F16K 1/305 137/442 |
| 5,836,022 A * | 11/1998 | Busenga | ............ | E04H 4/12 4/508 |
| 6,138,709 A * | 10/2000 | Home | ............ | F16K 31/34 137/413 |
| 6,142,175 A * | 11/2000 | Ku | ............ | F16K 31/26 137/446 |
| 6,178,994 B1 * | 1/2001 | Park | ............ | F16K 1/306 137/413 |
| 6,557,579 B2 * | 5/2003 | Kozik | ............ | F16K 1/303 137/422 |
| 6,640,829 B1 * | 11/2003 | Kerger | ............ | F16K 1/305 137/413 |
| 6,823,890 B1 * | 11/2004 | Hwang | ............ | F16K 31/26 137/446 |
| 6,874,528 B2 * | 4/2005 | Kozik | ............ | F16K 1/385 137/446 |
| 6,910,499 B2 * | 6/2005 | Chan | ............ | F16K 31/34 137/430 |
| 7,040,343 B2 * | 5/2006 | Tseng | ............ | F16K 31/265 137/430 |
| 7,647,938 B2 * | 1/2010 | Jobe | ............ | F16K 31/34 137/15.26 |
| 8,397,747 B2 * | 3/2013 | Hwang | ............ | F16K 31/26 137/445 |
| 9,049,842 B2 * | 6/2015 | Ho | ............ | A01K 7/04 |
| 9,470,333 B1 * | 10/2016 | Wenstrand | ............ | F16K 31/34 |
| 9,743,642 B2 * | 8/2017 | Rager | ............ | A01K 7/04 |

* cited by examiner

WATERER VALVE SYSTEM

PRIORITY CLAIM

This application claims priority to U.S. Provisional Patent Application No. 62/568,055 filed Oct. 4, 2017.

TECHNICAL FIELD

This disclosure generally relates to the use of a float valve to regulate water level within a reservoir.

BACKGROUND

One of the basic resources required to raise livestock is water. Livestock watering systems can provide standing or running water for livestock to consume. Traditionally, water supplied to livestock watering systems has come from private wells, which have operated at pressure levels of around 60 psi. More recently, water supplied to livestock watering systems has come from municipal water systems, which operate at higher pressure levels (e.g., 110-120 psi).

SUMMARY

In general, several embodiments relating to livestock waterer valve systems are disclosed herein. Such valve systems can control water flow from a water source to a livestock waterer. Using waterer valve systems designed to operate with low-pressure water sources for high-pressure water sources applications will likely lead to undesired effects. For example, such waterer valve systems may not operate properly to provide enough pressure to shut off the flow of water when necessary. Without proper accommodations, this excessive water flowing into the livestock waterer can lead to unintended flooding and water damage. Modifications to adjust the water pressure from a high-pressure water source to a low-pressure water source can be expensive and otherwise burdensome to maintain. Thus, it is desirable to have a livestock waterer that can accommodate high-pressure water sources without extensive modifications to water lines or the water source itself.

The present disclosure provides a livestock waterer that can accommodate high-pressure water sources and replenish water to deliver to livestock. Water can be supplied to the livestock waterer and stored in a water reservoir for consumption. The desired water level within the water reservoir can be determined. A valve system controls the flow of water into the water reservoir and can replenish the water to the determined level. The waterer valve system can include a float component, a float arm, a cam, a plunger, and a valve housing. The valve housing can be fixed to the water reservoir and have an elbow to orient the orifice downward into the water reservoir. The float component can have a generally flat bottom adapted to provide enough buoyancy force to close the valve using a high-pressure water supply.

As the valve system allows water to enter the water reservoir, the float component can be engaged, causing components of the valve system to move. Movement of the float can cause the float arm to move, the float arm can cause the cam to pivot, and the cam can pivot to move the plunger towards the orifice of the valve housing. When the plunger is not in sealing contact with the orifice, water can flow through the valve housing and out of the orifice. The addition of discharge ports increases the area through which water may flow, thereby maximizing the flow rate of the water through the valve. In some cases, the discharge ports can direct water away from the float component, the float arm, and the cam so as to minimize disruption of the flow and wear on the waterer valve system.

Some embodiments have an adjustment means for modifying the desired regulated level of water in the water reservoir. Traditional waterer valve systems were adjusted using a series of splined connections and relatively thin connectors. Rather than loosening the adjustable fasteners before manipulating the spline connections, users commonly just manipulate the spline connections, which cause the splines to wear and inhibit the adjustability of the float component or stiffness of the valve system. The present disclosure can contain an adjuster (e.g., a thumb screw) that can adjust the angle between the cam and the float arm. This adjustment can correspondingly raise and lower the float within the water reservoir to adjust the predetermined fill level.

Several embodiments of the present disclosure include a bracket. The bracket can be used to fix the valve system to the livestock waterer. The bracket can contain an elbow fitting, a clamp, and a valve connector. Traditionally, valves fixed to water reservoirs contained more components that were easy to lose or required additional assembly steps. Washers used to seal water line connections in such systems are likely to be misplaced as the unit is disassembled for maintenance. Upon reassembly without the washer, the lack of a seal allows water to exit through the connections in the water line causing, among other issues, misalignment of the float component to the valve. This can lead to poor operation and unnecessary fatigue on the assembly.

Many embodiments of the present disclosure offer several advantages over conventional, low-pressure waterer valves. For example, the sealing portion of the plunger in conventional systems that covers the orifice is fully seated in the seating portion, meaning that extra tools are required to remove the sealing portion. The sealing portion can be accessed by pulling a single pin. The float component and float arm are constructed to be more robust to help withstand higher levels of fatigue. The float component, arm, cam, plunger, and valve housing can be removably connected to each other for ease of assembly and disassembly. Plus, the need for separate seals can been reduced such that only the valve seal (which should be periodically replaced) is revealed during disassembly for maintenance.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

FIGS. 2A-2C are perspective views of an exemplary embodiment of the valve system of FIG. 1. FIGS. 2A and 2B show different views of the valve system when the cam is in a cam open position.

FIGS. 3A-3H are perspective views of an illustrative valve housing, plunger, cam, pivot pin, and float arm pin.

FIGS. 4A and 4B are perspective views of an illustrative plunger casing and insert.

FIGS. 5A and 5B are schematic, side elevational diagrams where the angle between the float arm and the cam has been adjusted.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
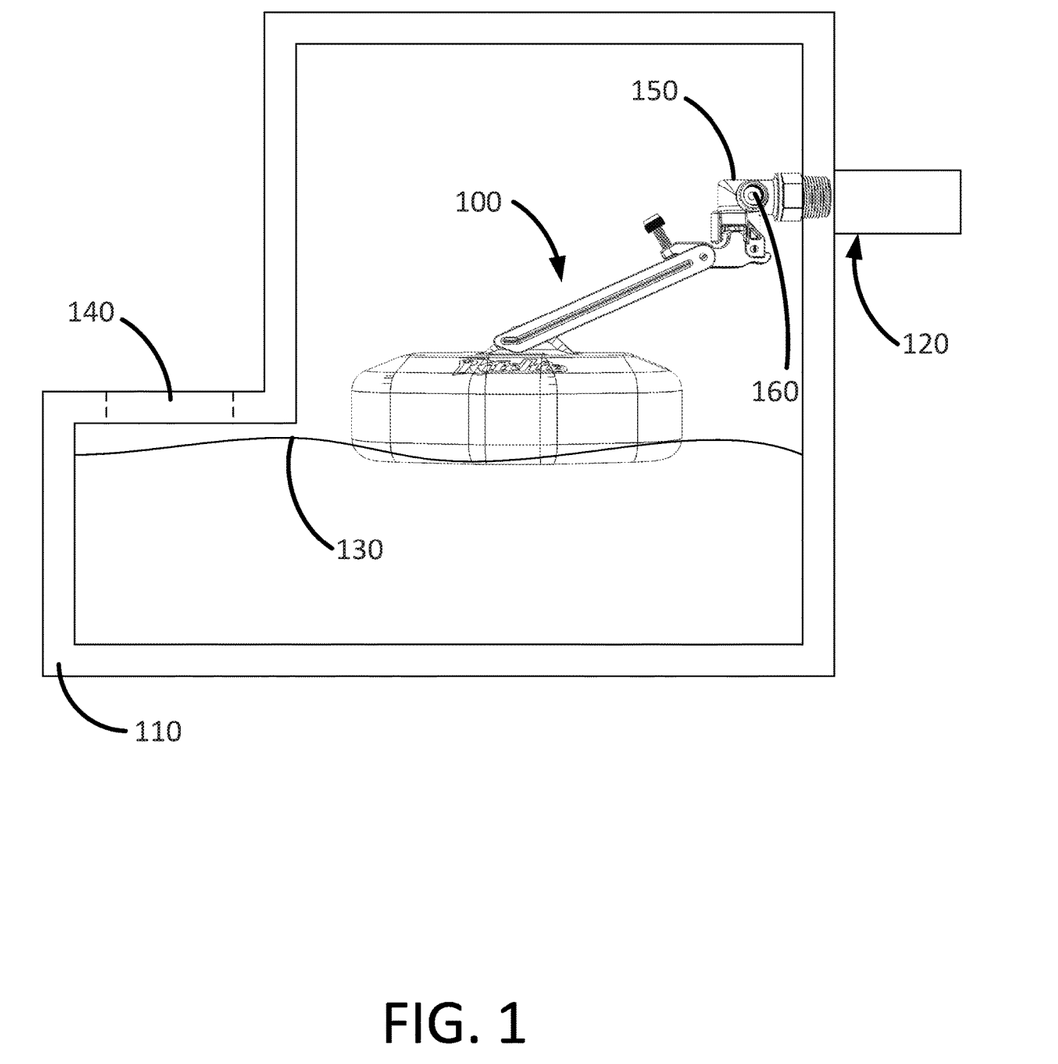
FIG. 1 is a schematic, side elevational diagram of an exemplary embodiment of a livestock waterer.

FIG. 1 shows an illustrative livestock waterer. The livestock waterer can include a waterer valve system 100, a water reservoir 110, and a water supply 120. The water reservoir 110 can include several sections. One section of the water reservoir 110 can be configured to have an appropriate height for livestock to approach and have access the water in the water reservoir. Another section of the livestock waterer can be configured to support a waterer valve system 100 and maintain a water level 130 within the reservoir 110 at a desired level.

The water level 130 in the water reservoir 110 should be high enough for livestock to access the water. Livestock can access the water through an access hole 140 in the water reservoir 110. The access hole 140 can be concealed with a float cover (not shown). The float cover can substantially seal the access hole 140. Proper sealing of the access hole 140 can minimize contamination risks due to outside elements and also reduce the amount of water lost due to evaporation. The float cover can be configured so as to seal the access hole 140 when the water level 130 is at the predetermined level. The float cover can move to allow livestock to access the water in the water reservoir 110, for instance, when the livestock presses its head against the float cover.

The waterer valve system 100 in an exemplary embodiment can include a valve housing 150. The valve housing 150 can be configured to be affixed to the water reservoir 110. The valve housing 150 can be configured to receive water from the water supply 120. The valve housing 150 can include an orifice. Water can exit the valve housing 150 through the orifice.

Many embodiments of the valve housing can include features to accommodate conventional supply mechanisms and facilitate maintenance of the valve system. The connecting portion of the valve housing to the water supply can be threaded complementary to the water supply (e.g., a water hose). The connecting portion may have an outer profile to facilitate the use of common tools to loosen or tighten connections. The outer profile may be hexagonal to accommodate, for instance, a common wrench. The connecting portion of the valve housing may also include one or a series of quick-acting couplings to facilitate easy removal and installation for maintenance.

Figure 2A:
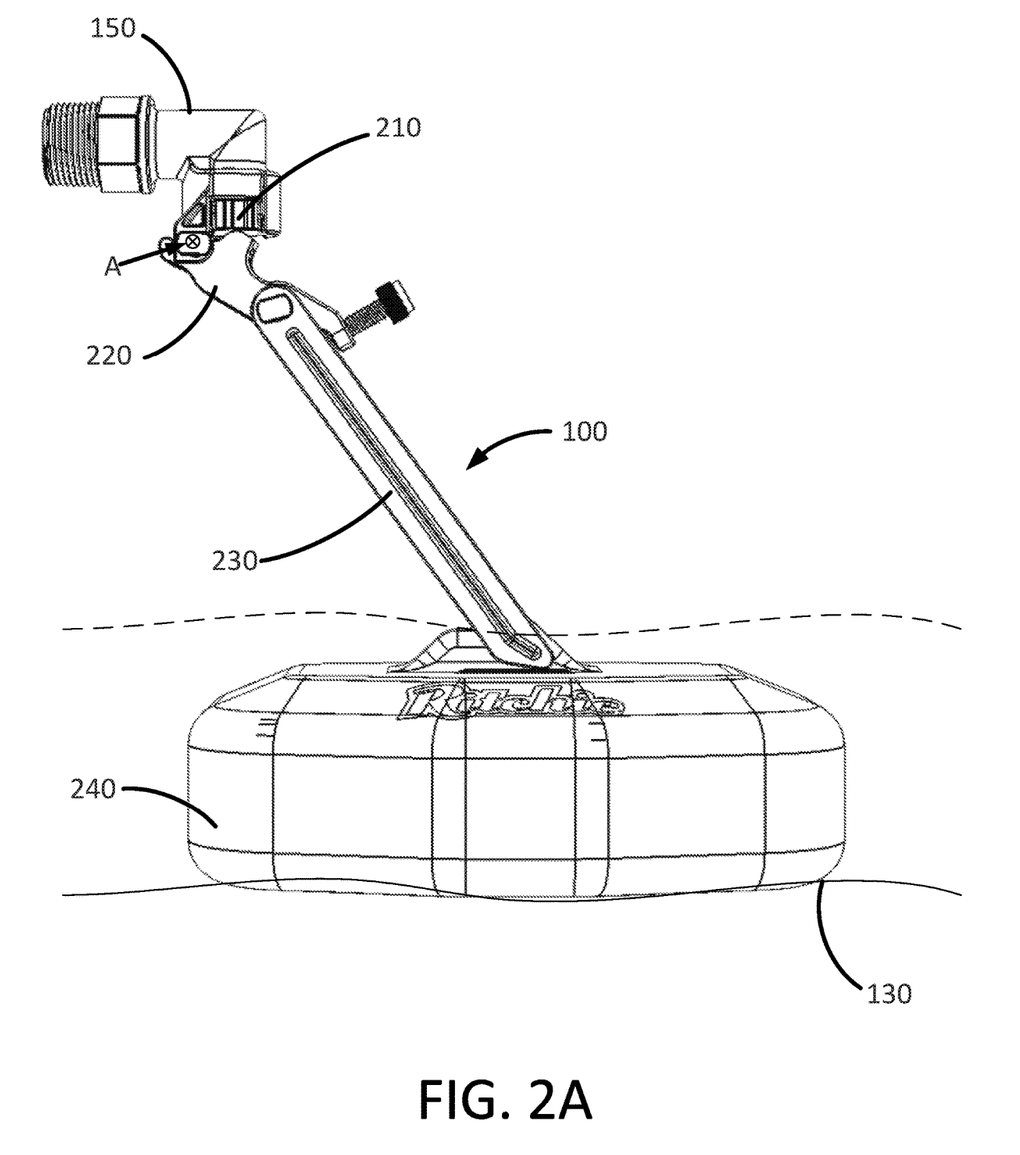
FIG. 2A is a side elevational view of the valve system and a corresponding water level when the cam is in a cam open position.
Figure 2B:
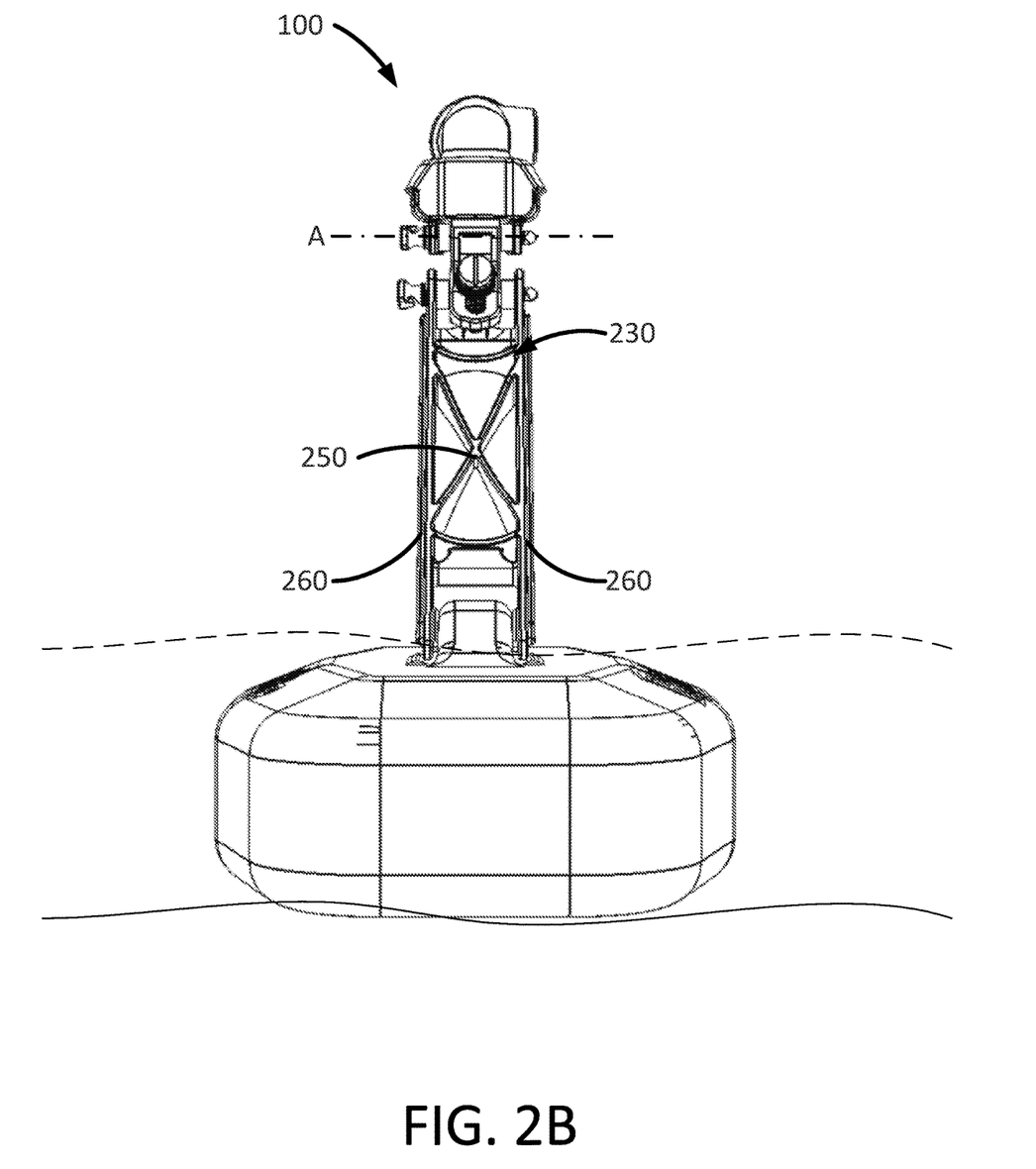
FIG. 2B is a rear elevational view of the valve system and a corresponding water level when the cam is in a cam open position.
Figure 2C:
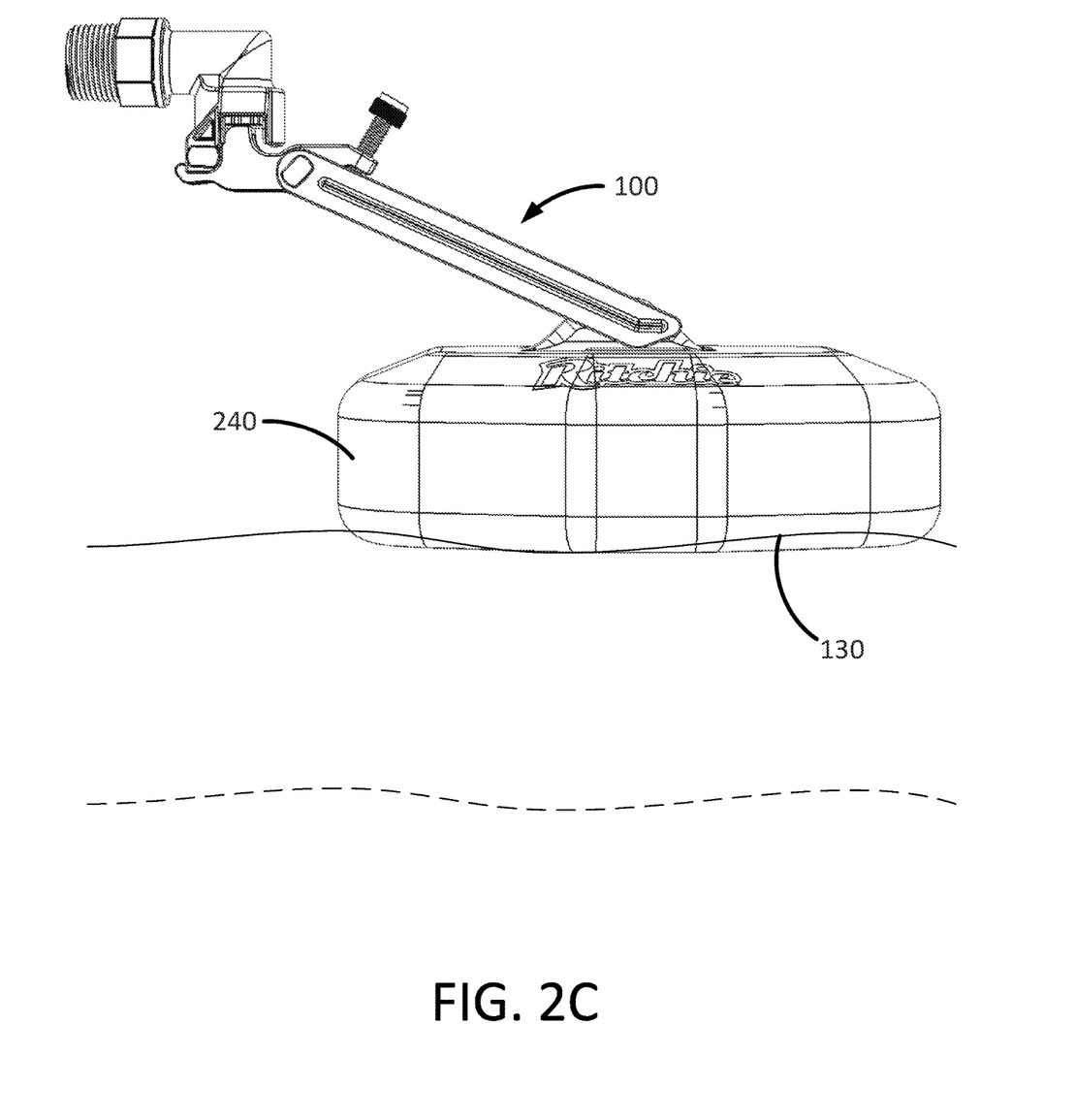
FIG. 2C shows the valve system and a corresponding water level when the cam is in a cam closed position.

FIGS. 2A-2C show how the illustrative waterer valve system 100 of the livestock waterer can regulate the flow of water into the water reservoir 110. The waterer valve system 100 can include a valve housing 150, a plunger 210, a cam 220, a float arm 230, and a float component 240. The float component 240 can be configured to float on water 130 in the water reservoir 110. The float component 240 can be coupled to one end of the float arm 230. The other end of the float arm 230 can be coupled to the cam 220.

Referring to FIGS. 2A-2B, water can fill the water reservoir when the water level 130 is below the predetermined level. The dashed line in FIGS. 2A-2B corresponds to the solid line in FIG. 2C, indicating the predetermined water level as above the illustrated water level 130 of FIG. 2A. The dashed line in FIG. 2C corresponds to the solid line in FIGS. 2A-2B, indicating that where the water 130 was in FIGS. 2A-2B is lower than the predetermined water level. In FIG. 2C, the water level 130 is at or around the predetermined level, which is above the water level shown in FIGS. 2A-2B.

As water fills the water reservoir, the rising water can raise the float component 240 cause other components of the waterer valve system 100 to move. For example, the waterer valve system 100 can receive water from the water supply line. The water from the water supply line can flow into and out of the valve housing 150 into the water reservoir. The float component 240 can vertically rise corresponding to the water level 130 inside of the water reservoir. As the float component 240 moves up and down based on the water level 130 in the reservoir, the float arm 230 causes rotation in the cam 220. Rotation of the cam 220 can thereby causes the valve to open and close. Thus, the waterer valve system 100 can be configured to replenish water within the water reservoir.

Over time, as the water level 130 rises to a predetermined level, the waterer valve system 100 can close the valve to shut off the flow of water from the water supply. Conversely, as the water level 130 decreases, the waterer valve system 100 can open the valve to fill the water reservoir with water. In operation, the water level 130 can be at a predetermined level within the water reservoir. The water level 130 can decrease, for example, as livestock consume water via the water access hole or due to evaporation to the environment. A decrease in water level 130 below the predetermined level can trigger the waterer valve system 100 to begin filling the water reservoir with water.

The waterer valve system 100 can be positioned in such a way that the float component 240 rests on the water level 130 in the reservoir. When the water level 130 is below the predetermined level, the waterer valve system 100 can allow water from the water supply to fill the livestock waterer back up to or around a predetermined level. At this point, the valve opens and water can be allowed into the valve housing 150 to fill the valve reservoir. When the water level 130 in the reservoir reaches a predetermined level, the waterer valve system 100 can shut off the incoming flow of water into the water reservoir.

FIGS. 2A-2C show how movement of the float component 240 and the float arm 230 can cause movement of the cam 220 and the plunger 210. The cam 220 can be pivotably coupled to the valve housing 150. The cam 220 can contain peripheral spacers to provide additional support to connected components and reduce the amount of friction between the cam 220 and components connected to the cam 220. The cam 220 may have one or more indentations to allow the cam 220 and the float arm 230 to rest at a substantially planar position. The one or more indentations can allow the cam 220 and the orifice of the valve housing 150 to rest at a position substantially parallel to one another.

The cam 220 can be configured to pivot about a pivot axis, A, between a cam closed position and a cam open position. In the cam closed position, the cam 220 can press the plunger 210 into a plunger closed position in which the plunger 210 is in sealing contact with the orifice of the valve housing 150. In the cam open position, the cam 220 can allow the plunger 210 to move to a plunger open position in which the plunger 210 is not in sealing contact with the orifice. Vertical movement of the float component 240 can cause the float arm 230 to pivot the cam 220 between the cam closed position and the cam open position.

In some embodiments, the float component 240 can have a generally flat bottom surface. The float component 240 can have top, side, and bottom surfaces. The bottom surface of the float component 240 can be generally flat so as to maximize the buoyancy force on the float component 240 during operation. As the waterer valve system 100 is assembled, the increase in buoyancy force proportionally increases the pressure used to seal the valve. The increased sealing pressure allows for the valve to seal at higher water pressures.

In many embodiments, the generally flat bottom surface of the float component 240 can provide enhanced rotational stability to the waterer valve system 100 so that the float component 240 stays level within the water reservoir. The float component 240 can have at least one stop to limit the range of rotation of the float arm 230. In some embodiments, the end of the float arm 230 that is rotatably fixed to the float component 240 can include a pinch connector with tabs that engage complementary slots on the float component 240. The pinch connectors can be have a stepped profile so as to allow one portion to be wider than the corresponding female portion to reduce friction between moving components.

Though depicted as generally rectangular, the float component 240 may take on different shapes to achieve similar floatation qualities. For instance, the float component can be in the shape of a frustum. The generally flat bottom of the float component 240 may have one or more concave portions (e.g., dimples or corrugations) so as to maximize the amount of surface area exposed to the water, thereby increasing the buoyancy force. Similarly, the float component 240 can be made of a variety of materials and dimensions to achieve desired floatation qualities. For instance, the float component 240 can be substantially sealed so as to house a substance with high floatation qualities (e.g., air or foam). Substantially sealing the float component 240 can also prevent water from entering the float component that may minimize its effectiveness.

FIGS. 3A-3H illustrate how the position of the plunger 210 relative to the orifice 310 can determine whether water from the water supply 120 flows through the valve housing 150 into the water reservoir or not. FIGS. 3A-3D illustrate when the plunger is in the plunger closed position. FIGS. 3E-3H illustrate when the plunger is in the plunger open position. When the plunger 210 is in the plunger open position, water can exit the orifice 310 and flow into the water reservoir. When the plunger 210 is in the plunger closed position, water can be prevented from exiting the orifice 310.

The movement of the plunger 210 can correspond to the movement of the cam 220. For example, as the cam 220 moves from the cam open position to the cam closed position, the cam 220 moves upward relative to the valve housing 150. As the cam 220 moves upward, the cam contact surface 330 can contact the plunger contact surface 340 with a generally upward force. As a result, the plunger 210 moves from the plunger open position to the plunger closed position. Thus, the plunger 210 can move upward towards the orifice 310 in the valve housing 150 as the cam 220 moves from the cam open position to the cam closed position.

The plunger 210 can be slideably connected to the valve housing 150. The plunger 210 can travel along the plunger seat 320 as the plunger 210 moves between the plunger open position and the plunger closed position. When the cam 220 is in the cam closed position, the cam contact surface 330 can be flush with the plunger contact surface 340. The plunger 210 can be in sealing contact with the orifice 310 of the valve housing 150 when the plunger 210 is in the plunger closed position. When in the plunger closed position, the plunger 210 can apply enough force so as to seal the orifice 310 in the valve housing 150.

When the cam 220 is in the cam closed position, the plunger 210 can be forcibly held in the plunger closed position. The plunger 210 can have a sealing portion and a seat portion for housing the sealing portion. The sealing portion can be made of a pliable material (e.g., rubber) so as to seal the orifice 310 when the sealing portion is pressed against the orifice 310 with enough pressure.

The seat portion of the plunger 210 can be engaged by the cam 220 such that when the cam 220 is rotated by the float arm, the cam 220 moves the plunger 210. The edge of the orifice 310 that touches the plunger 210 can be raised so as to cause the outer surface of the sealing portion of the plunger 210 to deform where it contacts the orifice 310. Water cannot exit the orifice 310 when the plunger 210 is forcibly held in the plunger closed position. In some embodiments, the cam 220 can be attached to the seat portion of the plunger 210.

In similar relationship between the plunger 210 and the cam 220, the cam 220 can move from the cam closed position to the cam open position to allow water to fill the reservoir. As the cam 220 moves downward, away from the orifice 310, the plunger 210 can move from the plunger closed position to the plunger open position. When the plunger 210 is in the plunger open position, water can exit in the space between the orifice 310 in the valve housing 150 and the plunger 210. As described herein, when the water exits, it can be guided by the profile of the valve housing 150. The exiting water can be used to fill the water reservoir.

The cam 220 can move from the cam closed position to the cam open position until at least one cam stop engages the valve housing 150. The at least one cam stop can have a first section and a second section. The first section can be configured such as to rest generally flush with a surface of the valve housing 150 when the cam 220 is in a cam open position. The second section can protrude upwardly at an angle less than 180 degrees from the first section of the cam stop. The second section of the cam stop can be configured such that it can contact the valve housing 150.

In operation, the movement of the cam 220 can drive the plunger 210 into substantially sealing contact with the orifice 310 in the valve housing 150. As the cam 220 pivots upward about the pivot axis (A in FIGS. 2A-2B), at least a portion of the cam can contact the plunger 210. The plunger 210 travels vertically along the plunger seat 320 and reaches the orifice 310. The cam 220 continues to move upwardly, towards the valve housing 150. In the cam closed position, the cam 220 presses the plunger 210 against the orifice 310 with enough force to prevent water from exiting the orifice 310.

As shown in FIGS. 3A-3H, when the valve housing 150 is affixed to the water reservoir, vertical movement of the plunger 210 can regulate the flow of water into the water reservoir. The valve housing 150 can include an elbow 315. The elbow 315 can orient the orifice 310 downwardly when the valve housing 150 is affixed to the water reservoir. The valve housing 150 can include a plunger seat 320.

The plunger seat 320 can be configured to guide vertical movement of the plunger 210 when the valve housing 150 is affixed to the water reservoir. The plunger 210 can have a profile which facilitates travel along the plunger seat 320. The plunger 210 can have a peripheral outer wall. The peripheral outer wall of the plunger 210 can be in contact with the plunger seat 320. The peripheral outer wall can be corrugated. The peripheral outer wall can have two or more protrusions. The corrugations and/or protrusions can be the only contact the plunger 210 has with the plunger seat 320, providing minimal contact between surfaces. Such minimal contact can reduce the amount of friction and thereby reduce the amount of force required to move the plunger 210 and probability of sticking.

In some embodiments, the surface area of where the cam 220 contacts the plunger 210 can be relatively large. The cam 220 can have a cam contact surface 330 that contacts a plunger contact surface 340 as the cam 220 presses the plunger 210. The plunger contact surface 340 can have a first width. The cam contact surface 330 can have a second width. The second width can be greater than half the first width.

The cam contact surface 330 can be designed to provide a distributed force where it contacts the plunger contact surface 340. The width of the cam contact surface 330 can be greater than the height of the peripheral outer wall of the plunger 210. The cam contact surface 330 can include a curved portion and a flat portion. The curved portion of the cam contact surface 330 can be configured in such a way that as that the cam 220 moves, the width of the cam contact surface 330 is in contact with the plunger 210. The flat portion can be in flush contact with the plunger contact surface 340 when the cam 220 is in the cam closed position.

A relatively large cam contact surface 330 can result in greater distribution of force to the plunger 210. A larger cam contact surface 330 increases the rotational stability of the plunger 210, ensuring a better seal of the orifice 310. The larger cam contact surface 330 can also reduce unnecessary wear and tear on the touching components.

Figure 3A:
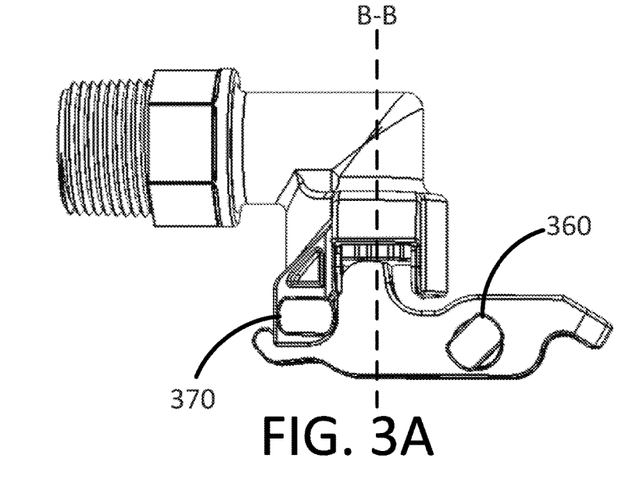
FIG. 3A is a side elevational view of the valve housing in an exemplary embodiment when the cam is in a cam closed position.
Figure 3B:
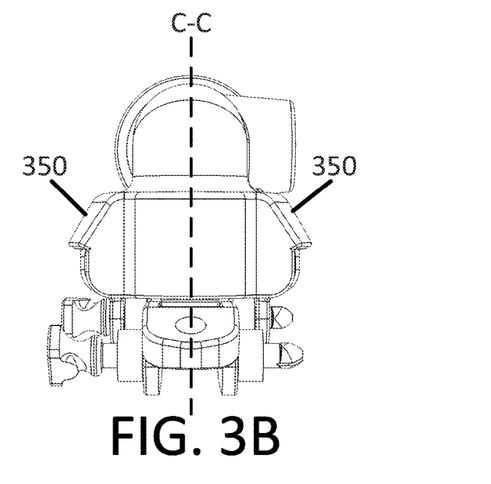
FIG. 3B is a rear elevational view of the valve housing in an exemplary embodiment when the cam is in a cam closed position.
Figure 3C:
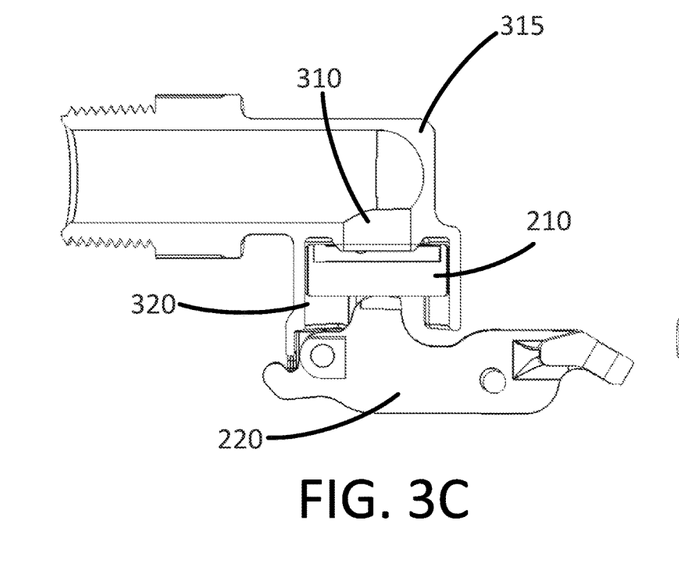
FIG. 3C shows a cross-sectional view of the valve housing in FIG. 3A taken at plane B-B.
Figure 3D:
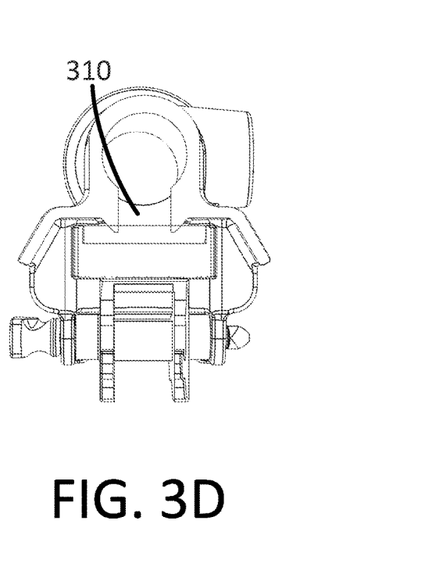
FIG. 3D shows a cross-sectional view of the valve housing in FIG. 3B taken at plane A-A.
Figure 3E:
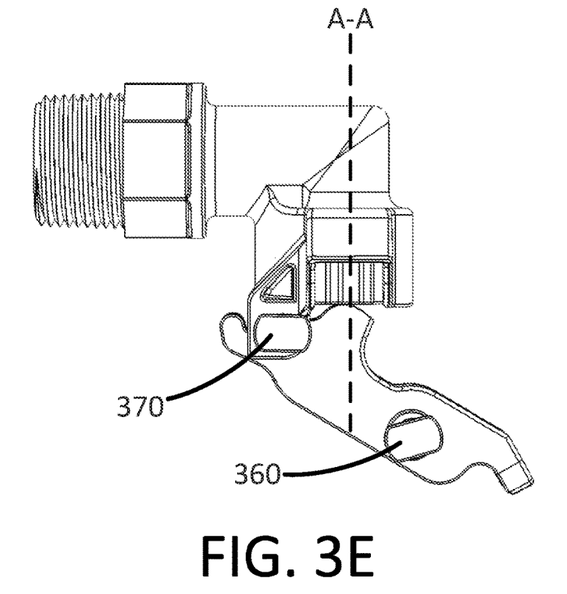
FIG. 3E is a side elevational view of the valve housing in an exemplary embodiment when the cam is in a cam open position.
Figure 3F:
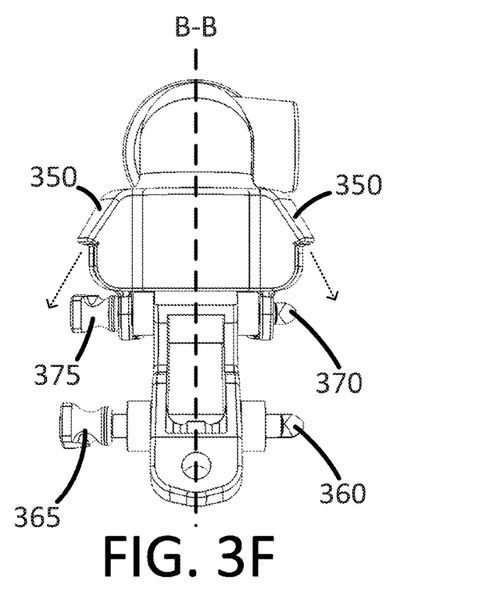
FIG. 3F is a rear elevational view of the valve housing in an exemplary embodiment when the cam is in a cam open position.
Figure 3G:
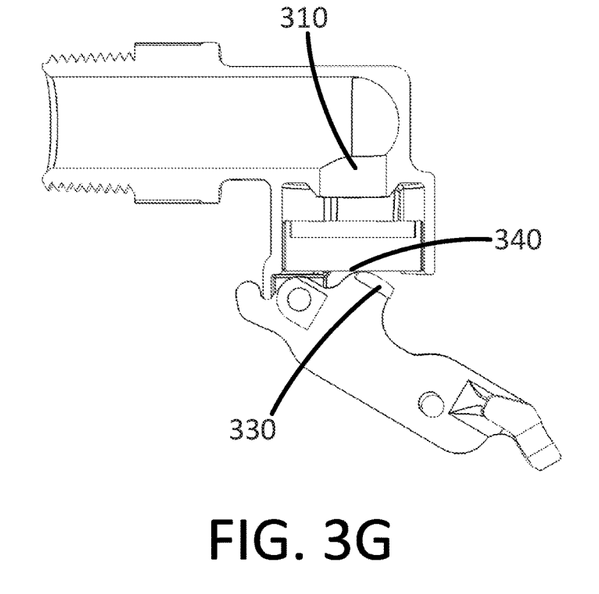
FIG. 3G shows a cross-sectional view of the valve housing in FIG. 3E taken at plane B-B.
Figure 3H:
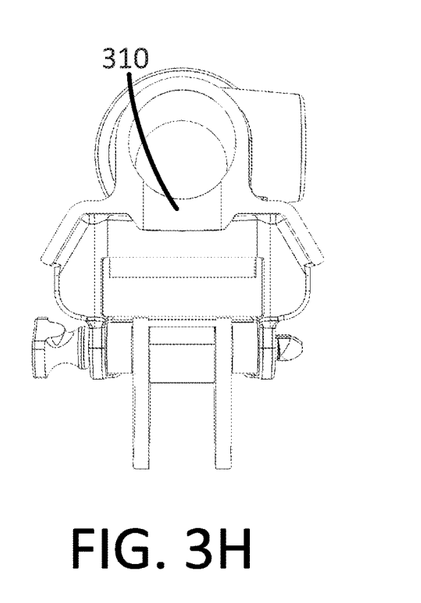
FIG. 3H shows a cross-sectional view of the valve housing in FIG. 3F taken at plane A-A.

In some embodiments, the plunger 210 seat can include first and second side spouts 350 as seen in FIGS. 3B and 3F. The first and second side spouts 350 can be configured to deflect water exiting the orifice 310 and contacting the plunger 210 out to opposing sides of the plunger 210 as shown by the dashed arrows in FIG. 3F. The opening of first and second side spouts 350 can be fixed or variable to control the direction and flow of exiting water. As water exits an opening between the plunger 210 and the orifice 310, it can travel along the inner profile of the first and second side spouts 350 and directed away from the cam 220, float arm 230, and float component 240.

FIGS. 3A and 3E-3F show an illustrative float arm pin 360 that can couple the float arm to the cam 220. The float arm pin 360 can include a float arm pin handle 365. The float arm pin handle 365 can be configured to permit the float arm pin 360 to be removed from the float arm and the cam 220. The float arm handle can have an outer profile designed to ergonomically accommodate gripping by hands. The distal end of the float arm pin handle 365 relative to the float arm pin 360 can have a larger cross section that the float arm pin 360.

FIGS. 3A and 3E-3F show an illustrative pivot pin 370 that can pivotably couple the cam 220 to the valve housing 150. The pivot pin 370 can include a pivot pin handle 375. The pivot pin handle 375 can be configured to permit the pivot pin 370 to be removed from the cam 220 and the valve housing 150. The pivot pin handle 375 can have an outer profile designed to ergonomically accommodate gripping by hands. The distal end of the pivot pin handle 375 relative to the pivot pin 370 can have a larger cross section that the pivot pin 370.

The float arm pin 360 and the pivot pin 370 can be mechanically retained for functional and safety purposes. The float arm pin 360 and the pivot pin 370 can have a restraining mechanism at the end opposite the float arm pin handle 365 and the pivot pin handle 375 respectively. The restraining mechanism can ensure proper axial and radial alignment of each pin between the connecting components. The restraining mechanism can also act as a safety mechanism to prevent unintended removal of the pin. The restraining mechanism can be a separate component (e.g., a clevis pin) or integral to the pin itself (e.g., a split pin).

Referring back to FIG. 1, a valve housing 150 can include a petcock valve port 160. The valve can have an emboss where a user can drill a hole and thread in a petcock valve. At least a portion of the water in the valve housing 150 can be directed through the petcock valve port 160 once the emboss is opened. The petcock valve port 160 can be configured to be threadably connected to a petcock valve. This additional flow can be used in a variety of applications including providing constant flow to the reservoir 110 or training livestock.

Referring back to FIG. 2B, a float arm 230 can be used in some waterer valve system 100 embodiments. The float arm 230 can include first and second opposed side rails 260. The float arm 230 can include one or more support members 250. The one or more support members 250 can span between the first and second opposed side rails 260.

Figure 4A:
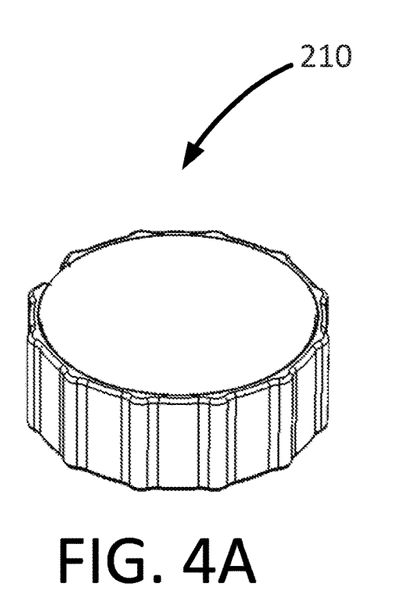
FIG. 4A shows the insert encased by the plunger casing.
Figure 4B:
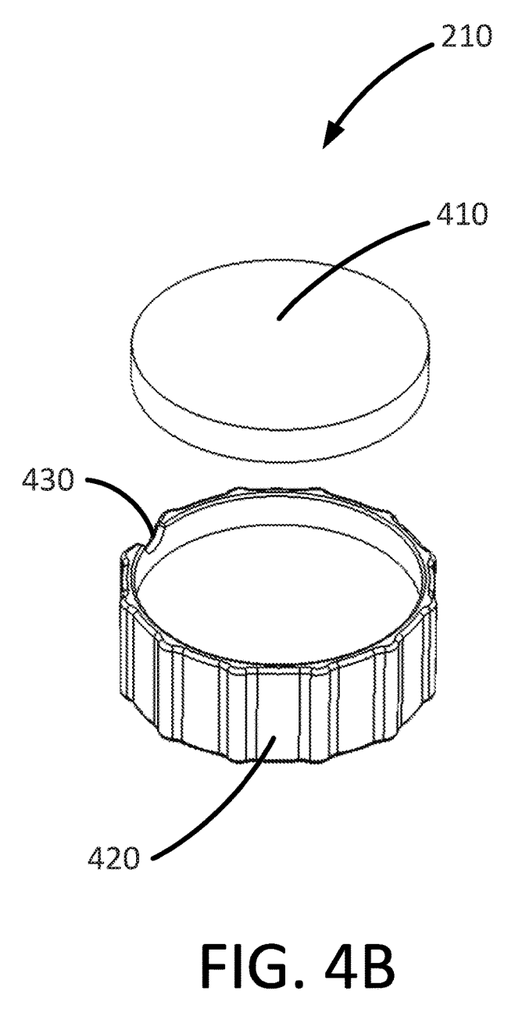
FIG. 4B shows an exploded view of the plunger casing and insert.

FIGS. 4A-4B show an illustrative plunger 210. The plunger 210 can have a casing 420 and an elastomeric insert 410. The elastomeric insert 410 can be encased by the casing 420. The elastomer insert can have a peripheral geometry complementary to the casing. The casing 420 can include a notch 430. The notch 430 can be configured to facilitate removal of the elastomeric insert 410. The notch 430 can be of a size and shape as to accommodate a fingernail or a screwdriver. The casing 420 can have an outer peripheral surface as described prior herein.

Figure 5A:
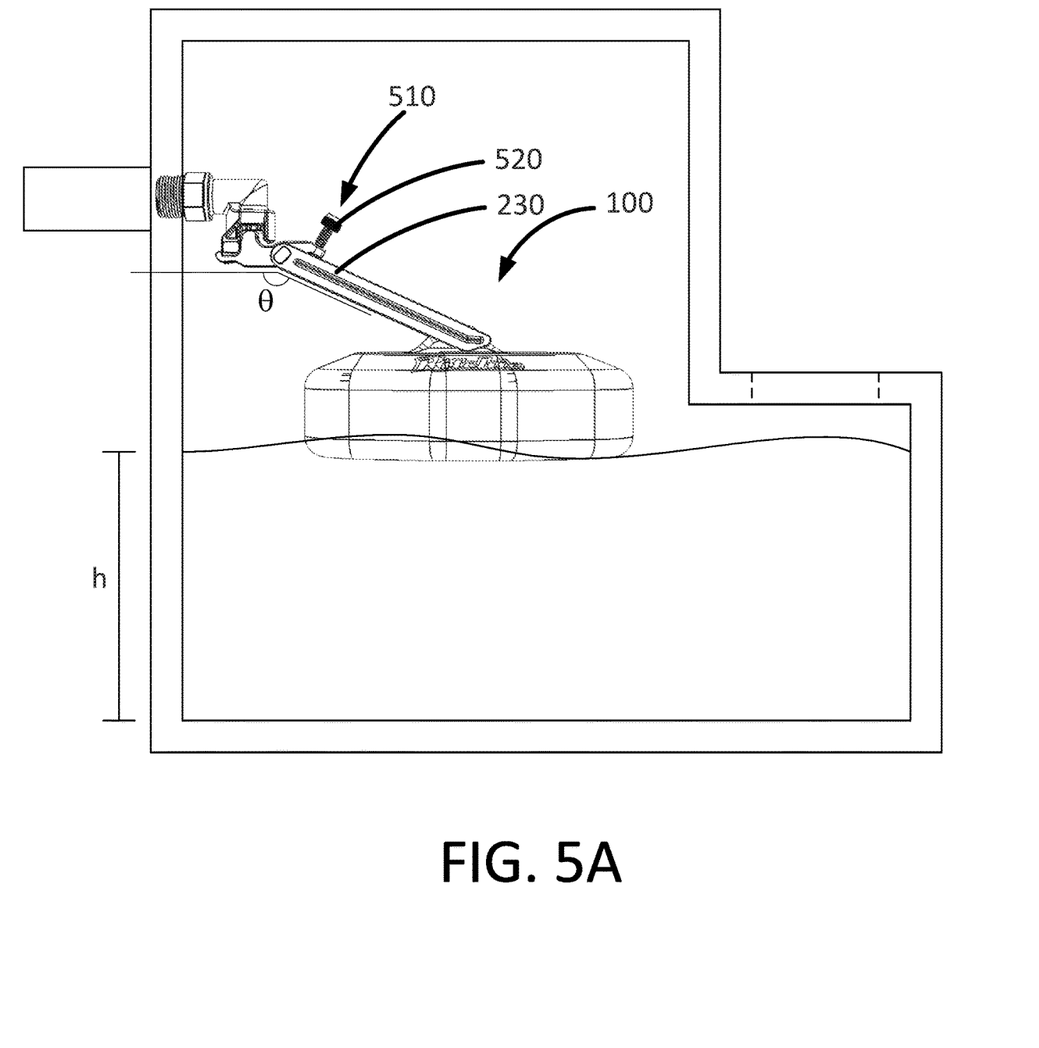
FIG. 5A shows the water level in the water reservoir when the adjuster is not tightened.
Figure 5B:
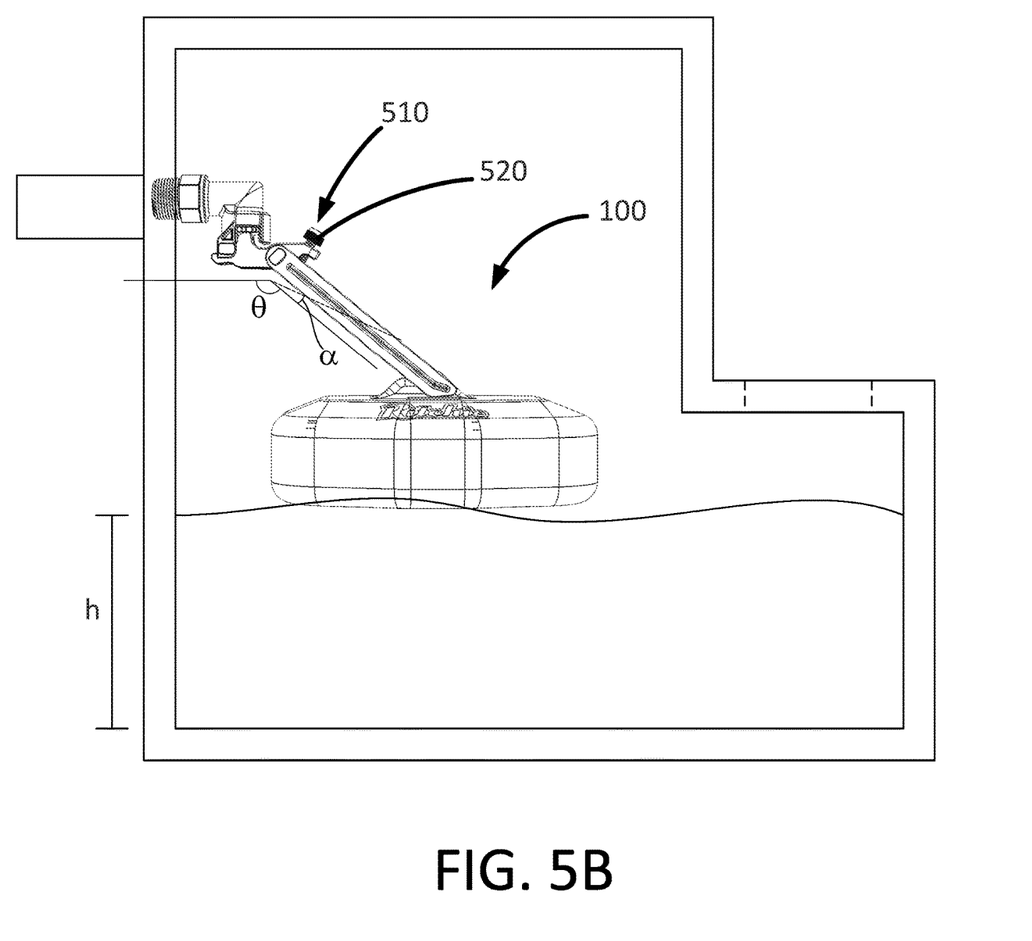
FIG. 5B shows the water level in the water reservoir when the adjuster is tightened and the angle is adjusted.

FIGS. 5A-5B illustrate how the waterer valve system 100 can be adjusted to establish a predetermined water level. The livestock waterer valve system 100 can include an adjuster 510. The adjuster 510 can be configured to set a depth of the float component 240. The depth of the float component 240 can be set by adjusting an arm angle, θ, between the float arm 230 and the cam 220. Adjusting the arm angle, θ, thereby dictates the height of the water level in the water reservoir, h.

In some embodiments, the adjuster 510 can include a screw 520. The screw 520 can be threadedly coupled to the cam 220. The screw 520 can be pressed against the float arm 230 to adjust the arm angle, θ. The screw 520 can have a head that can be easily turned using a hand or a tool. Using a limiting device (e.g., a thumb screw) to adjust the level of the float component can reduce the wear and misuse issues. Many embodiments can have an adjuster 510 with a contact surface for the screw 520 configured to reduce the amount of fatigue and wear during adjustments and operation. The contact surface can have a thicker cross section than the surrounding areas or be made of a different material.

Figure 6:
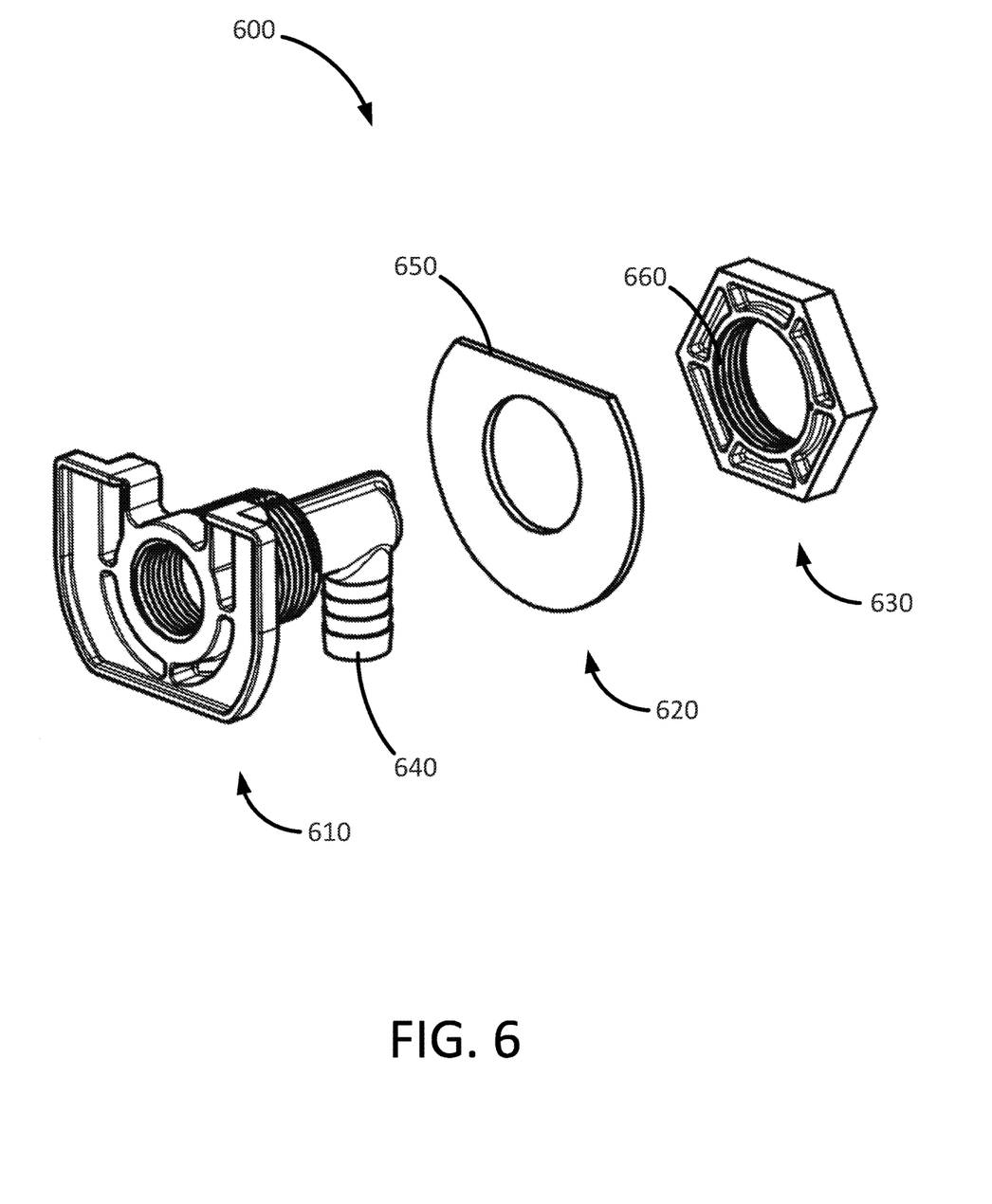
FIG. 6 is a perspective, exploded view of an illustrative bracket.

FIG. 6 shows an illustrative bracket 600 that can couple the valve housing to the water reservoir and the water supply. The bracket 600 can include an elbow fitting 610, a clamp 620, and a valve connector 630. A hose connecting portion 640 of the elbow fitting 610 can be adapted (e.g., corrugating the outer surface or including mechanical locks) to prevent the attached hose from slipping off. The elbow fitting 610 can be configured to be coupled to a vertically oriented water hose. The elbow fitting 610 can be configured to be coupled to the valve connector 630. The elbow fitting 610 can have one or more tab portions adapted to rest within a corresponding slot in the water reservoir. The tab and slot combination can reduce spinning of the bracket at the water reservoir attachment during assembly, disassembly, and operation.

The clamp 620 can be configured to be coupled to an upper edge of the water reservoir. The upper portion of the clamp 650 can be generally flat. The valve connector 630 can be configured to be coupled to the valve housing 150. The inner surface of the valve connector 660 can be threadably connected to the elbow fitting 610. The peripheral surface of the valve connector 630 can be adapted to allow tightening by conventional screws. The outer profile of the valve connector 630 can be hexagonal.

Figure 7:
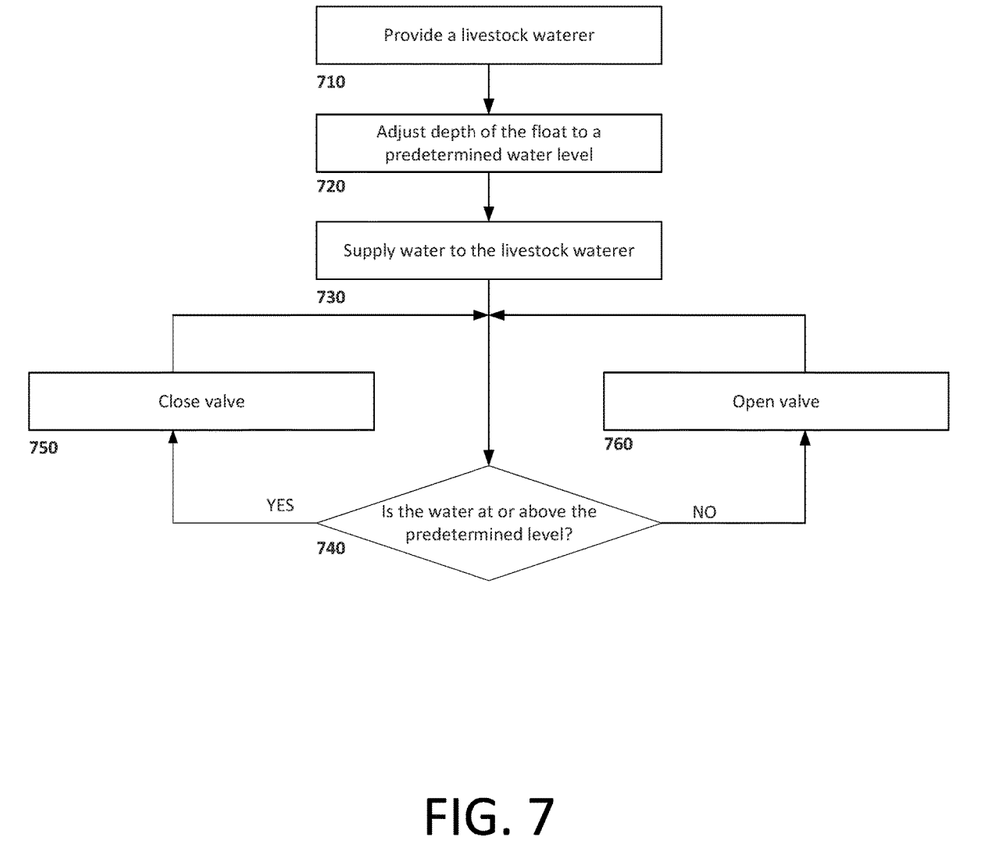
FIG. 7 is a flow diagram of an exemplary embodiment of a method for of regulating water levels in a livestock waterer.

FIG. 7 shows an illustrative method of regulating water levels in a livestock waterer. The method can include providing a livestock waterer 710 such as those discussed elsewhere herein. The method can include adjusting the depth of the float component to a predetermined water level as described herein 720. The method can include supplying water to the livestock waterer from the water supply 730. If the water level is at or above the predetermined level at step 740, the valve system will close the valve 750. If the water level is not at or above the predetermined level at step 740, the valve system will open the valve 760.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A livestock waterer valve system comprising:
   (a) a valve housing configured to be affixed to a water reservoir and to receive water from a water supply, the valve housing including an orifice through which water exits the valve housing, the valve housing further including an elbow that orients the orifice downwardly when the valve housing is affixed to the water reservoir and a plunger seat configured to guide vertical movement of a plunger when the valve housing is affixed to the water reservoir, wherein the plunger seat includes first and second side spouts;
   (b) a plunger coupled to the valve housing and movable vertically between a plunger closed position in which the plunger is in sealing contact with the orifice and a plunger open position in which the plunger is not in sealing contact with the orifice;
   (c) a cam pivotably coupled to the valve housing and comprising a cam contact surface with a curved portion and a flat portion, the cam being configured to pivot about a pivot axis between a cam closed position in which the cam contact surface presses the plunger into the plunger closed position and a cam open position in which the cam allows the plunger to move to the plunger open position, the curved portion and the flat portion of the cam contact surface contacting the plunger, wherein the pivot axis is horizontally offset from the cam contact surface and the first and second side spouts are configured to deflect water exiting the orifice and contacting the plunger out to opposing sides of the plunger and the cam and downwardly into the water reservoir;
   (d) a float arm having a first end coupled to the cam and a second end; and
   (e) a float component coupled to the second end of the float arm, the float component having a generally flat bottom surface configured to float on water in the water reservoir, with vertical movement of the float component causing the float arm to pivot the cam between the cam closed position and the cam open position.

2. The livestock waterer valve system of claim 1, wherein the valve housing further includes a petcock valve port.

3. The livestock waterer valve system of claim 1, wherein the plunger comprises a casing and an elastomeric insert encased by the casing, and wherein the casing includes a notch configured to facilitate removal of the elastomeric insert.

4. The livestock waterer valve system of claim 1, wherein:
   the plunger has a plunger contact surface with a first width,
   the cam contact surface contacts the plunger contact surface when pressing the plunger, and the cam contact surface has a second width that is greater than half the first width.

5. The livestock waterer valve system of claim 1, wherein the float arm comprises first and second opposed side rails and one or more support members that span between the first and second opposed side rails.

6. The livestock waterer valve system of claim 1, further comprising a bracket that includes an elbow fitting configured to be coupled to a vertically oriented water hose, a clamp configured to be coupled to an upper edge of the water reservoir, and a valve connector configured to be coupled to the valve housing.

7. The livestock waterer valve system of claim 1, further comprising a pivot pin pivotably coupling the cam to the valve housing, the pivot pin including a pivot pin handle configured to permit the pivot pin to be removed from the cam and the valve housing.

8. The livestock waterer valve system of claim 1, further comprising a float arm pin coupling the float arm to the cam, the float arm pin including a float arm pin handle configured to permit the float arm pin to be removed from the float arm and the cam.

9. The livestock waterer valve system of claim 1, further comprising an adjuster configured to set a depth of the float component by adjusting an arm angle between the float arm and the cam, wherein the adjuster comprises a screw threadedly coupled to the cam and pressed against the float arm.

10. The livestock waterer valve system of claim 1, wherein the cam further comprises a cam stop configured to engage the valve housing when the cam is in the cam open position to prevent movement of the cam beyond the cam open position.

11. The livestock waterer valve system of claim 1, wherein the cam further comprises one or more indentations to permit the float arm to rest at a substantially planar position.

12. A method comprising:
(a) providing a livestock waterer that includes a water reservoir, a water supply, and a valve system, the valve system comprising:
  (i) a valve housing affixed to the water reservoir and receiving water from the water supply, the valve housing including an orifice through which water exits the valve housing, the valve housing further including an elbow that orients the orifice downwardly and a plunger seat that includes first and second side spouts,
  (ii) a plunger coupled to the valve housing and movable vertically between a plunger closed position in which the plunger is in sealing contact with the orifice and a plunger open position in which the plunger is not in sealing contact with the orifice, wherein the plunger seat is configured to guide vertical movement of the plunger,
  (iii) a cam pivotably coupled to the valve housing and comprising a cam contact surface with a curved portion and a flat portion, the cam being configured to pivot about a pivot axis between a cam closed position in which the cam contact surface presses the plunger into the plunger closed position and a cam open position in which the cam allows the plunger to move to the plunger open position, the curved portion and the flat portion of the cam contact surface contacting the plunger,
  (iv) a float arm having a first end coupled to the cam and a second end, and
  (v) a float component coupled to the second end of the float arm, the float component having a generally flat bottom surface configured to float on water in the water reservoir, with vertical movement of the float component causing the float arm to pivot the cam between the cam closed position and the cam open position; and
(b) supplying water to the livestock waterer from the water supply, wherein:
  (i) water exits the orifice of the valve housing and is deflected out to opposing sides of the plunger and the cam through the first and second side spouts and flows downwardly into the water reservoir when the plunger is in the plunger open position, and
  (ii) water is prevented from exiting the orifice of the valve housing when the plunger is in the plunger closed position.

13. The method of claim 12, further comprising setting a depth of the float component by adjusting a screw that is threadedly coupled to the cam and pressed against the float arm to adjust an arm angle between the float arm and the cam.

14. A livestock waterer comprising:
(a) a water reservoir;
(b) a water supply, and
(c) a valve system that comprises:
  (i) a valve housing configured to be affixed to the water reservoir and to receive water from the water supply, the valve housing including an orifice through which water exits the valve housing, further including first and second side spouts;
  (ii) a plunger coupled to the valve housing and movable vertically between a plunger closed position in which the plunger is in sealing contact with the orifice and a plunger open position in which the plunger is not in sealing contact with the orifice,
  (iii) a cam pivotably coupled to the valve housing and comprising a cam contact surface with a curved portion and a flat portion, the cam being configured to pivot about a pivot axis between a cam closed position in which the cam contact surface presses the plunger into the plunger closed position and a cam open position in which the cam allows the plunger to move to the plunger open position, the curved portion and the flat portion of the cam contact surface contacting the plunger, wherein the first and second side spouts are configured to deflect water exiting the orifice and contacting the plunger out to opposing sides of the plunger and the cam and downwardly into the water reservoir;
  (iv) a float arm having a first end coupled to the cam and a second end, and
  (v) a float component coupled to the second end of the float arm, the float component having a generally flat bottom surface configured to float on water in the water reservoir, with vertical movement of the float component causing the float arm to pivot the cam between the cam closed position and the cam open position.

15. The livestock waterer of claim 14, wherein the valve housing further includes a plunger seat, and the plunger has a peripheral outer wall with two or more protrusions, wherein the plunger contacts the plunger seat only at the two or more protrusions.

16. The livestock waterer of claim 14, wherein:
the plunger has a plunger contact surface with a first width,
the cam contact surface contacts the plunger contact surface when pressing the plunger, and the cam contact surface has a second width that is greater than half the first width.

17. The livestock waterer of claim 16, wherein the plunger further comprises a peripheral outer wall comprising a height, and the second width of the cam contact surface is greater than the height of the peripheral outer wall of the plunger.

18. The livestock waterer of claim 14, wherein the float arm comprises first and second opposed side rails and one or more support members that span between the first and second opposed side rails.

19. The livestock waterer of claim 14, wherein the valve system further comprises:
   (vi) a pivot pin pivotably coupling the cam to the valve housing, the pivot pin including a pivot pin handle configured to permit the pivot pin to be removed from the cam and the valve housing, and
   (vii) a float arm pin coupling the float arm to the cam, the float arm pin including a float arm pin handle configured to permit the float arm pin to be removed from the float arm and the cam.

20. The livestock waterer of claim 14, wherein the pivot axis is horizontally offset from the cam contact surface.

\* \* \* \* \*